Sept. 29, 1936.　　　F. W. SCHEIBEL　　　2,055,639
DOUGHNUT MACHINE
Filed April 10, 1936　　　3 Sheets-Sheet 1
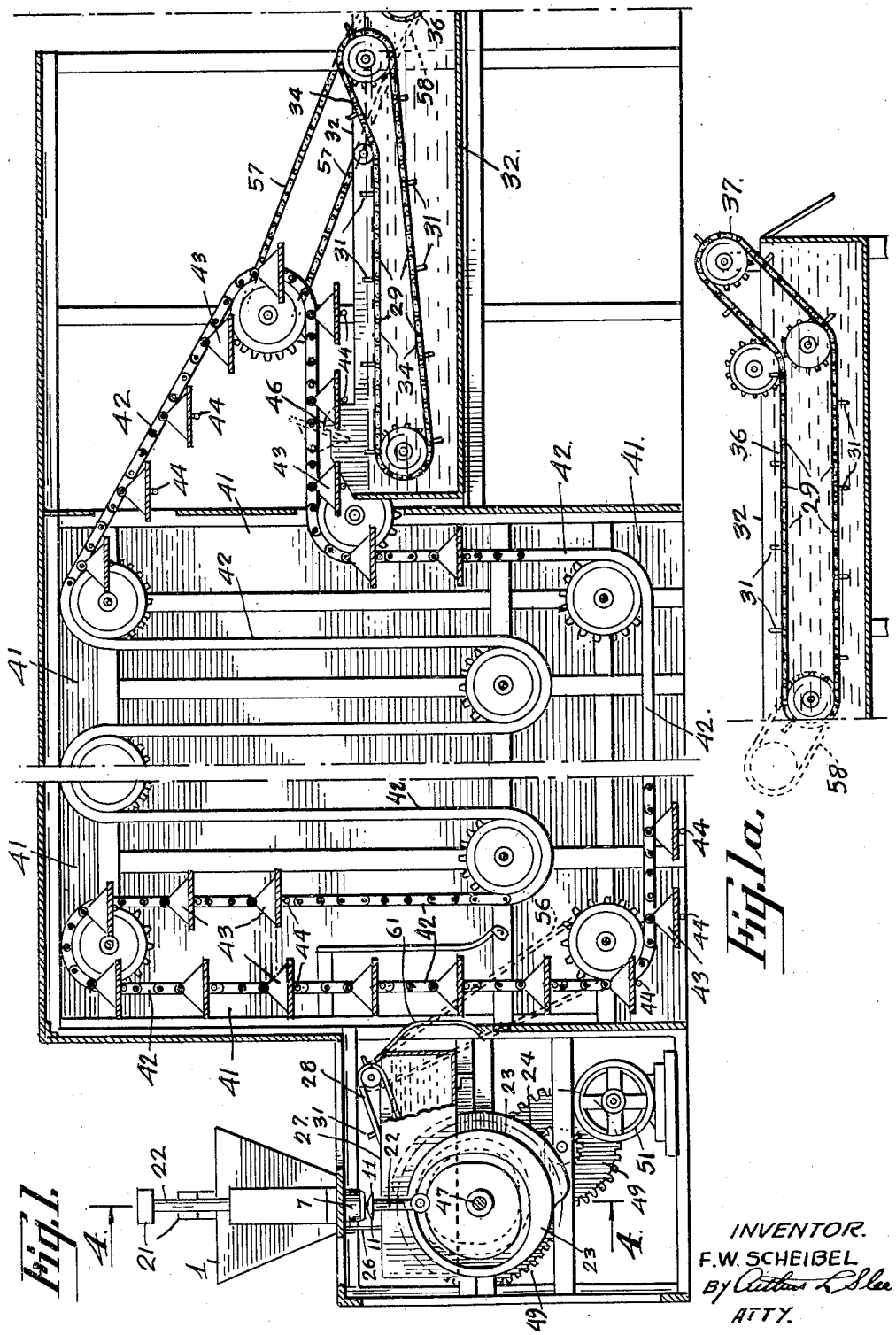
INVENTOR.
F.W. SCHEIBEL
ATTY.

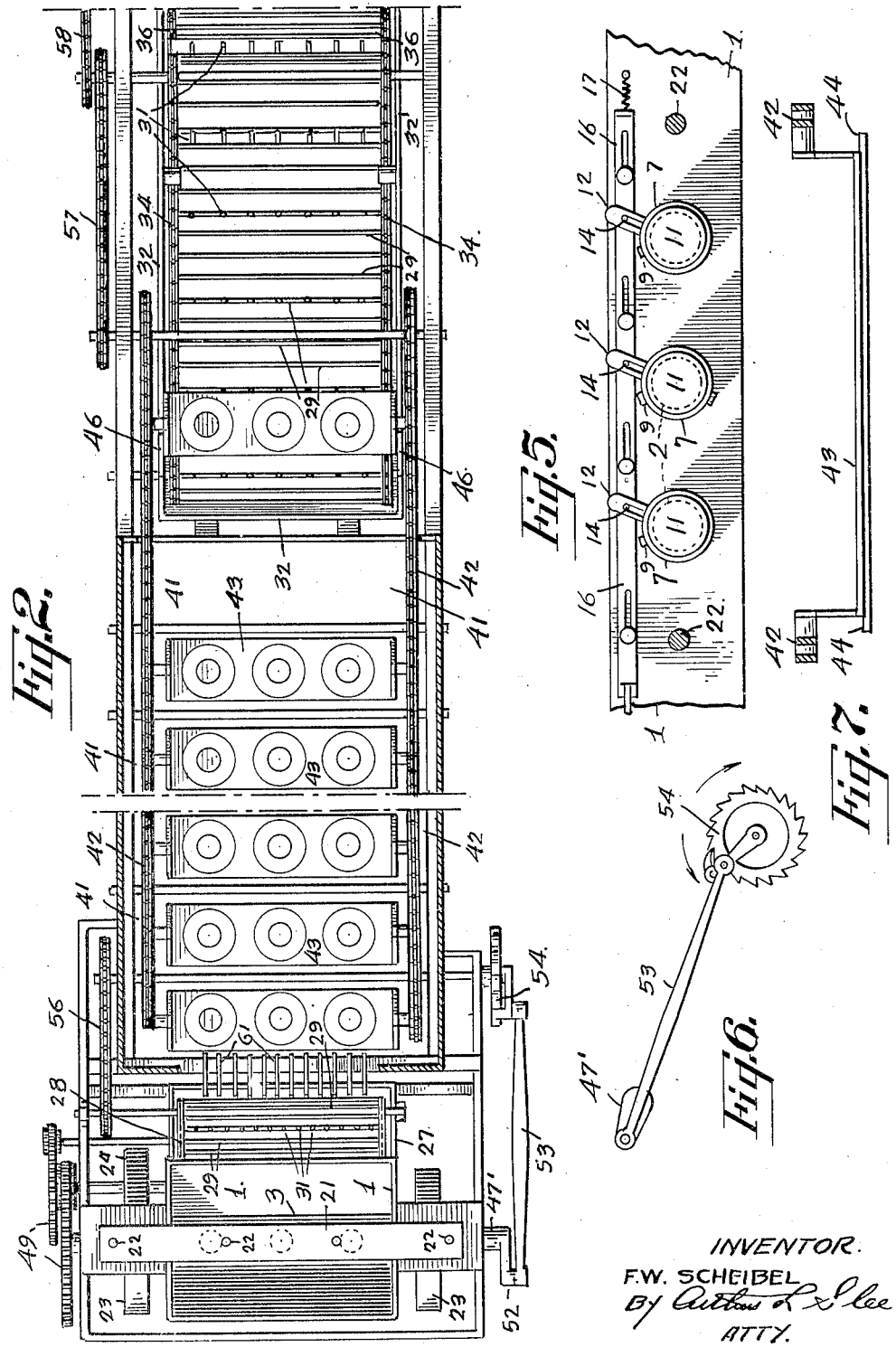

Sept. 29, 1936.  F. W. SCHEIBEL  2,055,639
DOUGHNUT MACHINE
Filed April 10, 1936  3 Sheets-Sheet 3
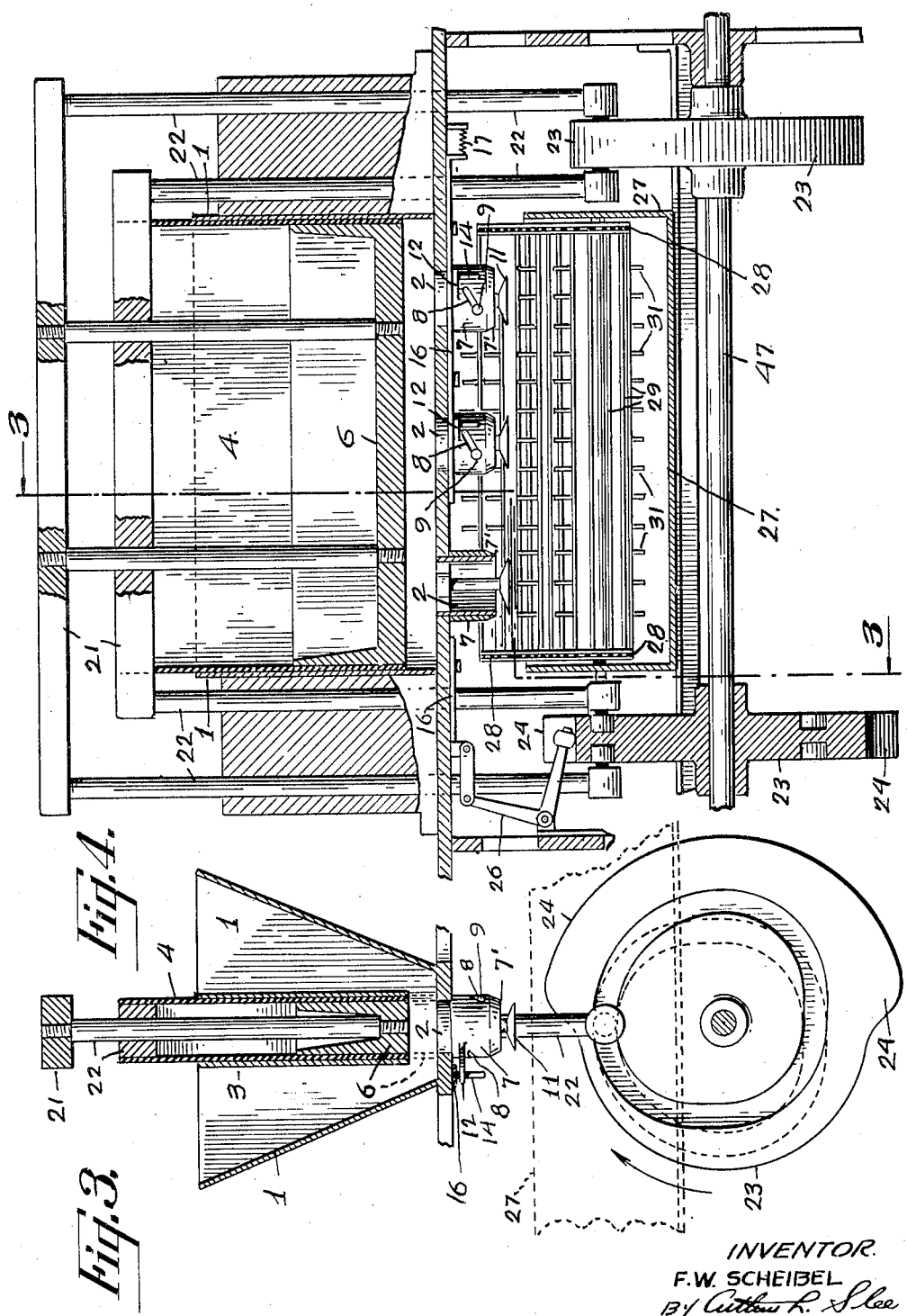
INVENTOR.
F.W. SCHEIBEL
BY Arthur L. Slee
ATTY.

Patented Sept. 29, 1936

2,055,639

UNITED STATES PATENT OFFICE 2,055,639

DOUGHNUT MACHINE

Frederick W. Scheibel, South San Francisco, Calif.

Application April 10, 1936, Serial No. 73,774

10 Claims. (Cl. 53—7)

My invention relates to improvements in doughnut forming and frying machines wherein improved means for pressing a predetermined amount of a mass of bread dough within a hopper through nozzles in the bottom thereof to form annular dough flanges on the bottoms of said nozzles, operates in conjunction with partially rotatable means for cutting said dough flanges from said nozzles and permitting the same to drop into a warming trough to start the process of raising said dough. Also with means for warming and raising said dough over a sufficient period to properly raise the formed doughnuts before dropping them into a frying vat, together with improved means for moving said doughnuts through said frying vat and for turning them over midway of said vat that both sides of said doughnut may be uniformly fried.

The primary object of the present invention is to provide a new and improved doughnut machine for producing properly raised and fried doughnuts from bread dough.

Another object is to provide a new and improved doughnut machine for producing raised and fried doughnuts from bread dough and having generally improved means for regulating the amount of dough within each doughnut in order that they may be of uniform weight.

Other objects and advantages, which will more fully appear in the following specification, are obtained by means of the device disclosed in the drawings forming a part of the present application, and in which—

Fig. 1 is a broken, vertical, longitudinal sectional view of the machine and Fig. 1a an extension thereof;

Fig. 2 is a broken plan view, partly in section, of Fig. 1;

Fig. 3 is a vertical sectional view taken on line 3—3 of Fig. 4, in the direction indicated;

Fig. 4 is an enlarged, broken vertical sectional view taken on line 4—4 of Fig. 1, in the direction indicated;

Fig. 5 is a broken bottom plan view of the bottom of the hopper as shown in Fig. 4, and showing the nozzles and means for operating the cutting sleeves thereon;

Fig. 6 is a detailed view of a portion of the conveyor mechanism; and

Fig. 7 is an enlarged side elevation of one of the raising pans, disclosing the trips extending from each side thereof.

Referring to the drawings:

The numeral 1 is used to designate a suitable hopper having cylindrical nozzles 2 extending from the bottom thereof and a vertically and centrally disposed pocket 3 therein having an open lower end arranged in spaced relation to the bottom of said hopper and directly above the openings to the nozzles 2 thereof.

A sleeve 4 is slidably mounted within the pocket 2 and has its lower end normally registering with the lower end of said pocket 3. A suitable plunger 6 is in turn slidably mounted within the sleeve 4 and also has its lower end normally registering with the lower ends of the pocket 3 and sleeve 4 therein, as disclosed in Figs. 3 and 4 of the drawings.

What I term cutting sleeves 7, having cutting edges 7' on the lower ends thereof, are provided with diametrically opposed inclined slots 8 engaging pins 9 upon opposite sides of the nozzles 2 upon which said nozzles the sleeves 7 are rotatably mounted, so that when said sleeves 7 are partially rotated upon said nozzles 2, the said sleeves 7 will be moved downwardly with a rotary motion—like mother manually cutting out doughnuts—to sever into unfried doughnuts dough flanges, not shown, extruded from between the lower ends of the nozzles 2 and discs 11 arranged in spaced relation below said nozzles to produce such flanges.

Each sleeve 7 is also provided with a laterally extending slotted arm 12, each arm being engaged by a pin 14 depending from a bar 16 slidably mounted upon the bottom of the hopper 1 and normally held in a position which will keep the sleeves 7 in their upper or open position by means of the spring 17, as disclosed in Figs. 3, 4 and 5 of the drawings.

By means of the yokes 21 and rods 22 the sleeve 4 and plunger 6 are operatively connected to double grooved cams 23, one of which is provided upon its periphery with a raised portion 24 to actuate a bell-crank 26 in turn operatively connected to the slidably mounted bar 16 upon the bottom of the hopper 1.

Directly beneath the nozzles 3 of the hopper 1 is a warming trough 27 into which severed dough flanges or formed but unfried doughnuts drop from the nozzles 2, and within one end of which trough 27 is the lower end of an inclined conveyor 28 formed of spaced bars 29 certain of which are provided with equally spaced projecting fingers 31 for moving doughnuts, not shown, through said warming trough and warm grease therein to start the process of raising the bread dough of which said doughnuts are formed.

A suitable frying vat 32 is provided at the opposite end of the machine from the hopper 1 and said vat 32 has mounted therein a draper or conveyor 34 similar in construction and arrangement to the conveyor 28 within the trough 27. One end of the conveyor 34 is upwardly inclined to carry doughnuts through frying grease in said vat and turn them over to be engaged and moved through the remainder of said vat 32, in order that they may be fried on both sides, and then moved out of said vat by a second and similar conveyor 36 with an upwardly inclined end 37.

What I term a raising chamber 41 is provided between the frying vat 32 and the warming trough 27, said raising chamber 41 having moving therethrough an endless conveyor 42 and which has one portion thereof extending over one end of the frying vat 32, as disclosed in Fig. 1 of the drawings. A series of pans 43, of which only a few are shown, are pivotally suspended from the conveyor 42 throughout the length thereof, each pan being provided on its bottom with a longitudinally disposed rod 44 whose ends project beyond the ends of the pans 43 to be engaged by a trip 46 on each side of the vat 32, to trip said pans 43 and empty the contents thereof into one end of said vat 32.

The cams 23 are rigidly secured to a shaft 47 driven through a reducing train gear 49 from a suitable motor 51. One end of the shaft 47 is provided with a crank 52 connected by a rod 53 to a suitable pawl and ratchet mechanism indicated in general by the numeral 54 in turn connected operatively to the conveyor 42 within the raising chamber 41. From this conveyor 42 a chain drive 56 operates the conveyor 28 within the warming trough 27 while a similar drive 57 operates the first conveyor 34 of the frying vat 32 and a similar drive 58 performs a similar service for the second conveyor 36 within said vat 32.

It should be understood that the trough 27 and vat 32 are provided with grease which is heated by any suitable means, which heating means, forming no part of the present invention, may be so varied in character and so well understood in various arts as to require no further illustration or description in the present application.

In operation

A mass of bread dough is placed within the hopper 1 and forced well into the bottom thereof and particularly between the lower ends of the pocket 3, sleeve 4 and plunger 6 therein, and the machine, when the grease in the several troughs and vats is heated to the required degree, is then started. The heat of the grease in the trough 27 is about 100 degrees Fahrenheit, or just enough to warm the bread dough and start the process of raising therein while the heat of the grease in the vat 32 is sufficient for frying.

Rotation of the cams 23, in the direction indicated by the curved arrow in Fig. 3 of the drawings, will first move the sleeve 4 downwardly within the pocket 3 and segregate from the dough in the hopper a predetermined amount of dough. Continued rotation of the cams 23 will then move the plunger 6 downwardly and force the segregated bread dough through the nozzles 2, forming annular dough flanges. The cam 23 with the raised portion 24 upon the periphery thereof will then move said raised portion 24 to actuate the bell crank 26 and slidable rod 16 which in turn will, through the pins 14 and slotted arms 12, partially rotate the sleeves 7 so that the inclined slots 8 thereof, moving on the pins 9, will cause said sleeves 7 to move downwardly with a rotary motion and not only completely sever the dough flanges from the discs 11 but also close the lower ends of the nozzles 2.

The doughnuts thus formed and severed will drop into the warming trough 27 where the heat will immediately start the process of raising in said bread dough.

Continued movement of the cams 23 and shaft 47 thereof will first raise the plunger 6 and sleeve 4 and, as the lower ends of the nozzles 2 are closed by the sleeves 7, such movement of said plunger 6 will draw a new supply of dough under the sleeve 4 and plunger 6. The crank 47' on the shaft 47 will then actuate the pawl and ratchet mechanism 54 and the conveyor 42 and drive 56 which will in turn operate the conveyor 28 within the trough 27 and move any doughnuts therein over the railed chute 61 onto one of the pans 43 of the conveyor 42, through the medium of the bars 29 and fingers 31 thereon.

Continued movement of the shaft 47 will move the pans 43 containing doughnuts through the raising chamber 41 with an intermittent movement thereby delaying the progress of said doughnuts to the frying vat until they have raised sufficiently to be fried.

As each pan 43 encounters the trips 46 on the ends of the frying vat 32 said pan is tripped and empties its contents into one end of the said frying vat 32. The first conveyor 34 therein, by means of its lateral bars 29 and fingers 31 thereon, moves the doughnuts through the frying grease and turns said doughnuts over that the opposite sides thereof may also be fried. The doughnuts are turned over adjacent one end of the second conveyor 36 which conveyor, by means of its lateral bars 29 and fingers 31, and its inclined portion 37, moves the doughnuts through the frying grease and finally from the vat, to be delivered to any suitable receptacle, not shown, which may be provided.

Having described my invention I claim—

1. A doughnut machine comprising a doughnut forming mechanism for forming and dropping unfried doughnuts from the bottom thereof; a warming trough under said forming mechanism for receiving formed doughnuts therefrom and starting the process of raising said doughnuts; a frying vat; a raising chamber arranged between said frying vat and warming trough; an endless conveyor within said chamber for conveying doughnuts from said warming trough to said frying vat; and means for conveying doughnuts from said warming trough onto said conveyor.

2. A doughnut machine comprising a doughnut forming mechanism for forming and dropping unfried doughnuts from the bottom thereof; a warming trough under said forming mechanism for receiving formed doughnuts therefrom and starting the process of raising said doughnuts; a frying vat; a raising chamber arranged between said frying vat and warming trough; an endless conveyor within said chamber for conveying doughnuts from said warming trough to said frying vat; means for conveying doughnuts from said warming trough onto said conveyor, and tripping means mounted upon the frying vat for engaging and tripping said conveyor to empty doughnuts thereon into said frying vat.

3. A doughnut machine comprising a doughnut forming mechanism for forming and dropping unfried doughnuts from bread dough; a warming trough under said mechanism for receiving formed doughnuts and starting the raising process therein; a frying vat; a raising chamber arranged between said frying vat and warming trough; an endless conveyor within said chamber for conveying doughnuts from said warming trough to said frying vat; means for conveying doughnuts from said trough onto said conveyor; tripping means mounted upon the frying vat for tripping doughnuts therefrom and into said vat; and a conveyor mounted within one end of said frying vat for conveying doughnuts therethrough and turning said doughnuts over midway of said vat; and a second conveyor within said vat for receiving said turned doughnuts and conveying the same through the remainder of said vat and from the end thereof.

4. A doughnut machine comprising a doughnut forming mechanism for forming doughnuts from bread dough; a warming trough for receiving formed doughnuts from said forming mechanism and starting the raising process of said bread dough; a raising chamber; a frying vat; a conveyor within said raising chamber for conveying doughnuts therethrough from the warming trough to the frying vat; and means for conveying doughnuts from said warming trough to said conveyor.

5. A doughnut machine comprising a doughnut forming mechanism for forming doughnuts from bread dough; a warming trough for receiving formed doughnuts from said mechanism and starting the raising process in said dough; a frying vat; a raising chamber; a conveyor within said chamber for conveying doughnuts from said trough to said vat; means for conveying doughnuts from said trough onto said conveyor; and tripping means of said vat for tripping doughnuts from said conveyor into one end of said vat.

6. A doughnut machine comprising a doughnut forming mechanism for forming doughnuts from bread dough; a warming trough for receiving formed doughnuts from said mechanism and warming the same to start the process of raising; a frying vat; a raising chamber; a conveyor within said chamber for conveying doughnuts therethrough and to said vat; means for conveying doughnuts from said trough to said conveyor. tripping means mounted upon said vat for tripping the contents of said conveyor into one end of said vat; means for moving said doughnuts from said end and turning over said doughnuts at approximately the center of said vat; and means for moving said turned doughnuts through the remainder of said vat and discharging the same from said vat.

7. A doughnut machine comprising a hopper; nozzles depending from the bottom of said hopper; a disc arranged in spaced relation with the bottom of each nozzle; means for forcing bread dough through said nozzles to form doughnuts from said bread dough; a warming trough beneath said nozzles to receive doughnuts therefrom and start the process of raising said bread doughnuts; a frying vat; a raising chamber arranged between said trough and vat; a conveyor mounted within said chamber for conveying doughnuts therethrough while being raised and to a point without said chamber and over one end of said frying vat; means for transferring doughnuts from said trough to said conveyor; and tripping means mounted upon said vat for tripping doughnuts from said conveyor into one end of said vat.

8. A doughnut machine comprising a hopper; nozzles depending from the bottom of said hopper; a disc arranged in spaced relation with the bottom of each nozzle to form an annular space between said nozzle and disc; means for forcing bread dough through said annular space to form doughnuts; means for cutting formed doughnuts from said nozzles and closing said annular space when dough has been forced through said space; a warming trough arranged beneath said nozzles for receiving doughnuts therefrom and starting the raising process of said doughnuts; a frying vat; a raising chamber arranged between said trough and vat for raising doughnuts passing therethrough; a conveyor mounted within said chamber for conveying doughnuts therethrough and over one end of said frying vat; means for transferring warmed doughnuts from said trough to said conveyor; tripping means mounted on said vat for tripping said conveyor over said end to discharge doughnuts into said end of said vat; and means mounted within said frying vat for moving doughnuts therethrough, turning said doughnuts to fry the opposite side thereof and for discharging said fried doughnuts from said vat.

9. A doughnut machine comprising a hopper; circular nozzles depending from the bottom of said hopper; a disc arranged in spaced relation below the bottom of each nozzle to form an annular space between said discs and nozzles; a cutter mounted for downward rotary movement upon each nozzle to close said annular space; a centrally disposed pocket mounted within the hopper and having an open bottom arranged in spaced relation with the bottom of said hopper; a sleeve slidably mounted within said pocket for segregating a predetermined amount of dough from a mass of dough within said hopper; a plunger slidably mounted within said sleeve and having a lower end aligned with the lower ends of the pocket and sleeve therein; cam means for moving the sleeve to segregate a portion of dough then moving the plunger to force said segregated portion through the nozzles and annular spaces between the open ends of said nozzles and the discs to form annular dough flanges; then moving the cutter to sever said flange from said discs; a warming trough below said nozzles to receive formed doughnuts therefrom and start the process of raising in said dough; frying means for frying said doughnuts; a raising chamber between the frying means and warming trough and frying means; means for moving said doughnuts through said raising chamber to said frying means; and means for transferring said doughnuts from the warming trough to said moving means.

10. The combination with a doughnut machine of a bread dough hopper; cylindrical nozzles depending from the bottom of said hopper; a disc mounted in spaced relation below the lower end of each nozzle to form annular spaces between said nozzles and discs; a cutting sleeve rotatably mounted upon each nozzle and having oppositely inclined slots therein; pins mounted upon opposite sides of said nozzles and engaging said slots of the cutter to impart a downward rotary motion to said sleeves when partially rotated upon said nozzles to cut dough extruded from said annular spaces and form doughnuts from dough so extruded; a centrally disposed vertical pocket mounted in the hopper; a sleeve slidably mounted within said pocket to segregate a predetermined amount of dough from a mass of dough within said hopper; a plunger mounted within said sleeve for moving segregated dough through said nozzles and annular spaces; and cam means for first moving the sleeve in the hopper to segregate a portion of dough, then moving the plunger to extrude said segregated dough through said nozzles and then moving the cutters to sever dough extruded through the annular spaces with a rotary movement of said cutter; and for closing said annular spaces then moving said plunger and sleeve in the hopper while said annular spaces are closed by said cutting sleeves to draw dough from said hopper under said plunger; warming means for starting the raising process of said dough when cut from said nozzles; means for raising said dough through a period; and frying means for frying said dough on both sides thereof.

FREDERICK W. SCHEIBEL.